United States Patent [19]
Brickner

[11] Patent Number: 4,564,791
[45] Date of Patent: Jan. 14, 1986

[54] OPERATORS FOR SLIDING GATES

[76] Inventor: Joseph L. Brickner, 3046 Skywood, Orange, Calif. 92665

[21] Appl. No.: 532,905

[22] Filed: Sep. 16, 1983

[51] Int. Cl.[4] .......................... H04Q 7/02; H02P 1/44
[52] U.S. Cl. ....................................... 318/16; 318/122; 318/126; 318/266; 318/754; 49/18
[58] Field of Search ................. 318/16, 122, 126, 266, 318/12, 258, 269, 746, 747, 754, 763; 49/18, 334, 357; 70/190; 74/530, 535

[56] References Cited

U.S. PATENT DOCUMENTS

| | | | |
|---|---|---|---|
| 970,592 | 9/1910 | Ybarrondo | 318/16 |
| 1,289,074 | 12/1918 | Armagost | 49/357 |
| 1,964,308 | 6/1934 | Benario | 70/190 |
| 2,114,196 | 4/1938 | Tritle et al. | 74/535 |
| 3,178,627 | 4/1965 | Houk | 318/266 |
| 3,299,334 | 1/1967 | Ramadan | 318/16 |
| 3,735,224 | 5/1973 | Bachofer et al. | 318/284 |
| 4,119,896 | 10/1978 | Estes et al. | 318/266 |
| 4,128,793 | 12/1978 | Stich | 318/722 X |
| 4,141,010 | 2/1979 | Umpleby et al. | 340/825.69 X |
| 4,142,137 | 2/1979 | Umpleby et al. | 318/16 X |
| 4,145,641 | 3/1979 | Ozaki | 318/266 X |
| 4,232,296 | 11/1980 | Filipovic | 340/825.62 |
| 4,357,564 | 11/1982 | Deming et al. | 318/16 X |
| 4,385,296 | 5/1983 | Tsubaki et al. | 318/16 X |

*Primary Examiner*—William M. Shoop, Jr.
*Assistant Examiner*—Bentsu Ro
*Attorney, Agent, or Firm*—Rankin A. Milliken

[57] ABSTRACT

Operators for sliding gates including a solenoid-operated detent for engaging a gear of the gate drive motor shaft speed reducer and locking the associated gate, and a key-operated cam for disengaging the detent from the gear.

3 Claims, 3 Drawing Figures

OPERATORS FOR SLIDING GATES

BACKGROUND OF THE INVENTION

1. Field of the Invention

My present invention relates to operators for sliding gates, and more particularly to operators for heavy duty sliding gates such as those used to control the access of vehicles to parking areas and the like.

2. Description of the Prior Art

Operators for heavy duty sliding gates are well-known in the prior art. Such prior art gate operators typically comprise a weatherproof metal cabinet containing an electrical drive motor for driving an associated sliding gate between its limits of travel.

Also typically contained in the cabinet of such a prior art gate operator is a shaft speed reducer which is coupled between the output shaft of the drive motor and a stub shaft which carries a gate drive sprocket, and which is journalled in a bearing mounted in an opening in a wall of the cabinet. The gate drive sprocket is itself located immediately outside the cabinet wall.

In a typical prior art sliding gate operator installation the cabinet is located closely adjacent the gate, which is provided with a drive chain extending from end to end thereof and fastened to the gate at its ends. The gate drive chain is typically engaged with the gate drive sprocket and also engaged with two cooperating idler sprockets, which are themselves mounted on shafts which are journalled in bearings mounted in openings in the same wall of the cabinet. Such a prior art gate operator cabinet also typically contained an electronic control unit which serves to control the operation of the associated gate drive motor in response to suitable signals provided by, e.g., remote control radio transmitters, keys inserted in suitable locks carried by the cabinet, etc.

Power for operating the gate drive motor and exciting the components of the electronic control unit is typically supplied by means of a power connection which passes through a suitable opening in the cabinet wall.

Many of such prior art gate operators are characterized by certain deficiencies or disadvantages which render them less than fully effective to serve their intended purpose.

For example, when the operators of certain prior art sliding gate installations are de-energized (e.g., due to a power failure) the gates of those installations can be manually forced open by persons unauthorized to do so.

Further, the gates of certain prior art sliding gate installations are effectively locked in the open position (or sometimes the closed position) when an associated remote control transmitter with its operating switch inadvertently continuously depressed is located in the vicinity of the gate installation.

Yet further, certain prior art sliding gate operators are not provided with gate movement brakes which operate sufficiently rapidly to prevent property damage or personal injury when the presence of a vehicle or person in the path of motion of the gate is detected by an associated gate blockage detector, such as the gate blockage detector of my U.S. Pat. No 4,335,339.

(The term "prior art" as used herein or in any statement made by or on behalf of applicant means only that any document or thing referred to as prior art bears, directly or inferentially, a date which is earlier than the effective filing date hereof.)

SUMMARY OF THE INVENTION

Accordingly, it is an object of my present invention to provide improvements in operators for sliding gates which overcome the deficiencies and disadvantages of certain prior art gate operators described hereinabove.

A particular object of my present invention is to provide gate operators comprising simple, inexpensive, and effective means whereby the associated gate is positively locked against manual forcing whenever the drive motor is not moving the gate.

Another object of my present invention is to provide key-operated means whereby the just-described anti-forcing means can be deactivated, and thus the associated gate can be manually opened and closed during power failures and the like.

Yet another object of my present invention is to provide key-operated switch means whereby the gates of radio remote controlled sliding gate installations can be manually operated when a remote control transmitter with its operating switch inadvertently continuously depressed is located in the vicinity of the gate installation.

An additional object of my present invention is to provide inexpensive and effective gate movement braking means for power-operated sliding gate installations which operate so rapidly in response to signals from associated gate blockage detectors as to prevent damage to vehicles or injury to persons found in the path of the gate.

Other objects of my present invention will in part be obvious and will in part appear hereinafter.

My present invention, accordingly, comprises the apparatus embodying the features of construction, combinations of elements, and arrangements of parts exemplified in the following disclosure, and the scope of my present invention will be indicated in the claims appended hereto.

In accordance with a principal feature of my present invention, the gate operator of a power-operated gate installation is provided with a solenoid-operated detent which normally is engaged with the teeth of a sprocket or gear of the motor shaft speed reducer, and is withdrawn therefrom by said solenoid only when the gate drive motor is energized by the electronic control unit of the gate operator.

In accordance with another principal feature of my present invention, key-operated withdrawing means is provided for manually withdrawing said detent from said sprocket or gear when said solenoid cannot be energized due to a power failure or the like.

In accordance with a further principal feature of my present invention, the electronic control unit of a power-operated gate installation is so constructed and arranged that the gate can be manually operated by means of a suitable key when an associated remote control radio transmitter with its operating switch inadvertently constantly depressed is located in the vicinity of the gate installation.

In accordance with an additional principal feature of my present invention, the electronic control unit of a power-operated gate installation is so constructed and arranged that in response to a signal from an associated gate blockage detector both field windings of the gate driving motor are simultaneously energized, and thus the gate is brought substantially instantaneously to a halt, and damage to vehicles and injury to persons avoided.

For a fuller understanding of the nature and objects of my present invention, reference should be had to the following detailed description, taken in connecting with the accompanying drawings.

DESCRIPTION OF THE PREFERRED EMBODIMENT

Figure 1:
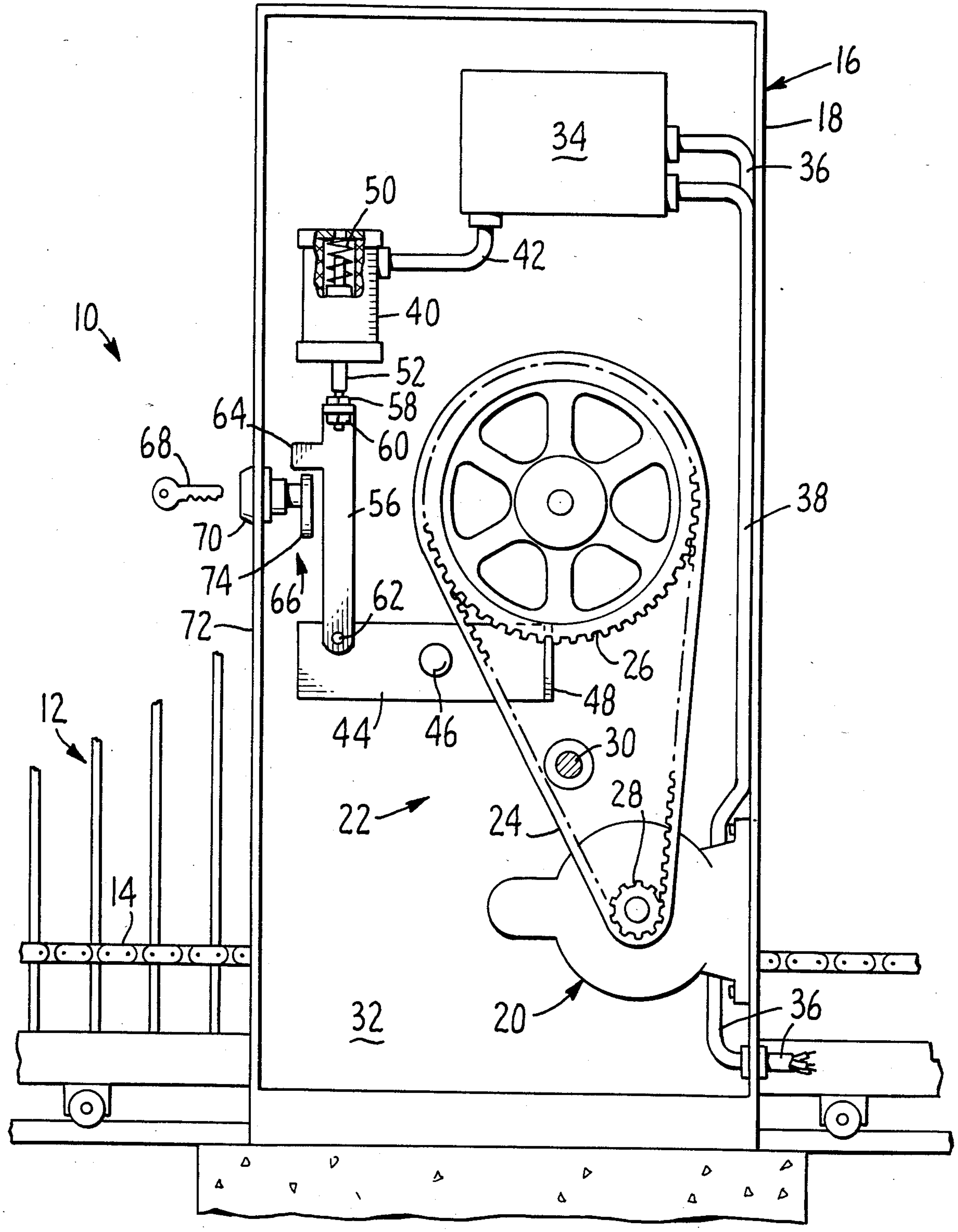
FIG. 1 is a schematic representation of a sliding gate installation embodying a principal feature of my present invention.

Referring now to FIG. 1, there is shown a power-operated sliding gate installation 10 which comprises a sliding gate 12 (shown in part only), a gate drive chain 14, which is attached at its opposite ends to gate 12, and a gate operator 16.

Gate operator 16 comprises a weatherproof cabinet 18 of well-known type in which are mounted a gate drive motor 20 and a shaft speed reducer 22, which itself comprises a drive belt 24 and co-acting gears 26 and 28. (In the preferred embodiment shaft speed reducer 22 further comprises an additional gear and drive belt, which are not shown in FIG. 1 for clarity of illustration.) The output shaft 30 of speed reducer 22 passes through rear wall 32 of cabinet 18, and carries a gate drive sprocket which coacts with gate drive chain 14.

Cabinet 18 further contains an electronic control unit 34, which is powered by way of an input power line 36, and supplies operating power to gate drive motor 20 via cable 38.

Electronic control unit 34 also serves to energize a detent operating solenoid 40 via cable 42. A rocker arm 44 is pivotably mounted on pivot 46, which is itself affixed to rear wall 32, and is provided at one end with an overturned portion or detent 48.

Detent 48 is urged into engagement with the teeth of gear 26 by the action of a solenoid plunger return spring 50 whenever solenoid 40 is de-energized. To this end, the plunger 52 of solenoid 40 is affixed to an overturned ear portion of a connecting link 56 by means of suitable nuts 58, 60, etc.

The lower end of connecting link 56 is pivotably joined to rocker arm 44 by means of a pivot pin 62, which is engaged with a hole in rocker arm 44 of such shape and size as to permit rocker arm 44 to rock sufficiently to engage and disengage detent 48 from the teeth of gear 26.

Thus, it will be seen that detent 48 will be withdrawn from the teeth of gear 26 when solenoid 40 is energized by electronic control unit 34. Electronic control unit 34 is so constructed and arranged as to energize solenoid 40 whenever gate drive motor 20 is energized.

As will be understood by those having ordinary skill in the art, informed by the present invention, the detent operating arrangement described thus far has the disadvantage that when a power failure occurs on power line 36 detent 48 is locked in engagement with the teeth of gear 26, and thus gate 12 cannot be operated manually.

In accordance with a principal feature of my present invention, however, manual gate releasing means 66 is provided, whereby detent 48 can be disengaged from gear 26 by means of a suitable key 68, and thus gate 12 can be manually operated in case of power failure on line 36, etc.

Gate releasing means 66 comprises a cam lock 70 of well-known type which is mounted in a suitable opening in the wall 72 of cabinet 18. An eccentric cam 74 which is a part of lock 70, and is rotated by key 68, serves to raise connecting link 56 by upward force on lock 64 of connecting link 56 when key 68 is turned to the position opposite that shown in FIG. 1 (teeth upward). Thus, it will be seen that detent 48 will be withdrawn from gear 26, and gate 12 released for manual operation, when key 68 is inserted into lock 70 and turned to its "teeth upward" position during a power failure on power line 36.

Figure 2:
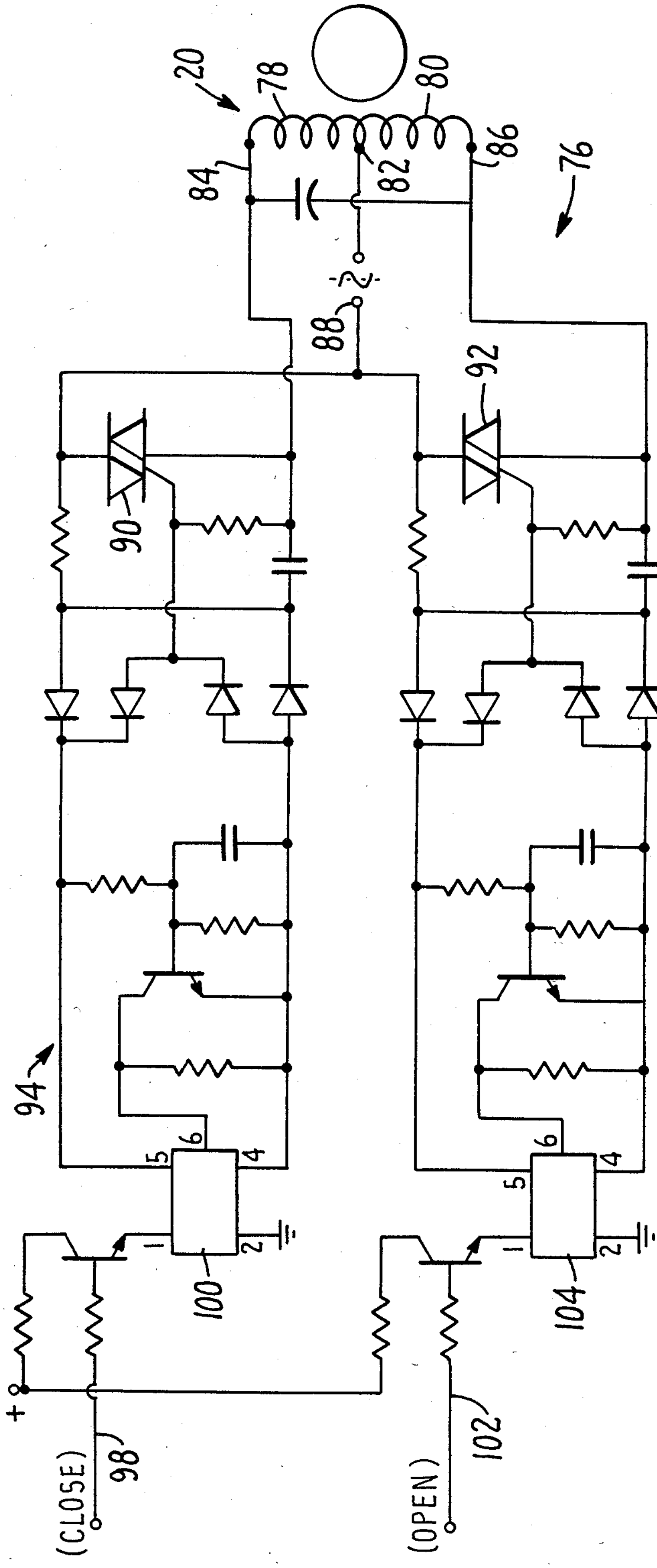
FIG. 2 is a schematic circuit diagram of the gate drive motor of the sliding gate installation of Fig. 1 and the part of the electronic control unit of the sliding gate installation of FIG. 1 by which the gate drive motor is controlled.

Referring now to FIG. 2, there is shown that part 76 of the circuit of electronic control unit 34 which serves to control the energization of gate drive motor 20.

In the preferred embodiment gate drive motor 20 is a permanent capacitor motor of the kind sold by the Leason Electric Corporation of Grafton, Wisconsin, and identified by the commercial designation M4P17DJ4A.

Motor 20 has two field windings 78, 80 which have a common terminal 82 and separate terminals 84 and 86. The alternating current power supplied to motor 20 is connected between common terminal 82 and a terminal 88 of subcircuit 76.

As also seen in FIG. 2, a first solid state triac switch 90 serves to close an energizing circuit through field winding 78, and a second triac switch 92 serves to close an energizing circuit through field winding 80.

The triac switches 90, 92 are controlled, respectively, by a control network 94 and a control network 96. Control network 94 extends from terminal 98 to triac 90, and includes an optical isolator 100 of well-known type. Similarly, network 96 extends from terminal 102 to triac 92, and includes an optical isolator 104 of well-known type. The selection of suitable components for networks 94 and 96 is within the scope of those having ordinary skill in the art, informed by the present disclosure.

The presence of a suitable signal (ground) on terminal 98 results in the "closing" of triac 90, and the energization of winding 78 of motor 20. The presence of a suitable signal (ground) on terminal 102 results in the "closing" of triac 92, and the energization of winding 80.

As seen in FIG. 2, the grounding of terminal 98 alone causes such rotation of motor 20 as to close gate 12, and the grounding of terminal 102 alone causes such rotation of motor 20 as to open gate 12.

Further, in accordance with a principal feature of my present invention, the grounding of both terminals 98 and 102 causes bucking currents in field windings 78 and 80. I have discovered that the excitation of such bucking currents in field windings 78 and 80 results in the almost instantaneous braking or halting of rotor drive motor 20, and that the maintenance in these windings of bucking currents of sufficient strength to substantially instantaneously brake or halt the rotor of drive motor 20 for considerable periods of time does no perceptible damage to drive motor 20.

In accordance with a principal feature of my present invention, electronic control unit 34 is constructed and arranged to receive emergency gate blockage signals from a gate blockage detector contained in cabinet 18, and to respond to such gate blockage signals by putting ground signals on both terminal 98 and terminal 102 (FIG. 2), whereby to produce said bucking currents in field windings 78 and 80, and to substantially instantaneously brake or halt the rotor of gate drive motor 20.

The provision of suitable circuitry for responding to such emergency gate blockage signals by grounding terminals 98 and 102 is within the scope of those having ordinary skill in the art, informed by the present disclosure, and thus such circuitry is omitted from the present drawings for clarity of illustration.

Further, electronic control unit 34 serves to either halt motor 20, and gate 12, in response to such emergency gate blockage signals, or serves to immediately drive gate 12 in its gate opening direction in response to such gate blockage signals; either mode of operation being available at the election of the installer. The provision of suitable circuitry for switching from gate closing energization to gate opening energization of motor 20 in response to such emergency gate blockage signals is within the scope of those having ordinary skill in the art, informed by the present disclosure, and thus such circuitry is omitted from the present drawings for clarity of illustration.

Figure 3:
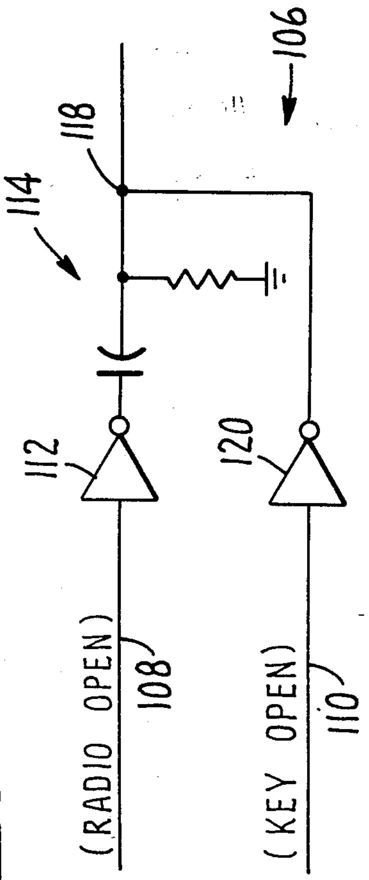
FIG. 3 is a schematic circuit diagram of a part of the electronic control unit of the sliding gate installation of FIG. 1.

Referring now to FIG. 3, there is shown the portion 106 of the electronic control unit 34 of gate operator 16 which receives the gate opening signals, remote control and manual.

Terminal 108 of circuit portion 106 is connected to the remote control radio receiver portion of electronic control unit 34, in the well-known manner, such that it (terminal 108) is grounded whenever a signal is received from associated remote control radio transmitters. After passing through an inverter 112, the signal on terminal 108 is applied to a resistance-capacitance differentiator network 114, which provides a "spike" signal at circuit junction 118. The signal at junction 118 is in turn applied to a subcircuit which provides a ground signal at terminal 108 (FIG. 2), thus serving to open gate 12.

Differntiator network 114 is provided to prevent the holding open of gate 12 by a continuous remote control transmitter signal, which occurs, for example, when a vehicle is parked near gate 12 with its remote control transmitter slipped down beside the front seat, which front seat holds the transmitter's gate opening pushbutton in its closed position.

While this arrangement serves to permit the closing of gate 12, e.g., after a suitable time delay, the continued presence of the transmitter signal in this example, and thus the continued presence of the corresponding signal on terminal 108, makes it impossible to re-open gate 12 by means of a second remote control transmitter, and thus prevents the use of gate 12 until a service man can locate the transmitter which is emitting the continuous signal.

For this reason, and in accordance with a principal feature of my present invention, I provide a second gate opening terminal 110, which is connected to junction 118 through a second inverter 120.

Terminal 110 is connected to a key-operated switch in such manner that it can be grounded by means of said key-operated switch, and thus gate 12 can be manually operated by authorized personnel (e.g., a building manager or custodian) having a suitable key, without having to wait upon the availability of a gate operator service man, who may not be available for many hours.

It will thus be seen that the objects set forth above, among those made apparent from the preceding description, are efficiently attained, and since certain changes may be made in the above constructions without departing from the scope of my present invention it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A gate operator, comprising:
a gate drive motor;
a shaft speed reducer comprising a gear coupled to said motor;
a detent for engaging the teeth of said gear and thus preventing rotation of said gear and movement of said gate;
solenoid means for withdrawing said detent from said teeth against the urging of a return spring;
solenoid energizing means for energizing said solenoid when said motor is energized; and
cam means for selectively withdrawing said detent from said teeth against the urging of said return spring.

2. A gate operator as claimed in claim 1, further comprising key-operated lock means for rotating said cam means.

3. A gate operator as claimed in claim 2 in which said motor, said speed reducer, said detent, and said cam means are located in a cabinet, and said lock means passes through a wall of said cabinet.

* * * * *